United States Patent [19]

Kohler

[11] Patent Number: 4,535,646

[45] Date of Patent: Aug. 20, 1985

[54] THROTTLE LINKAGE STRUCTURE AND METHOD FOR ITS ASSEMBLY AND DISASSEMBLY

[75] Inventor: Ramon C. Kohler, Aurora, Ill.

[73] Assignee: Caterpillar Tractor Co., Peoria, Ill.

[21] Appl. No.: 483,079

[22] Filed: Feb. 7, 1983

Related U.S. Application Data

[63] Continuation of Ser. No. 261,095, Oct. 9, 1980, abandoned.

[51] Int. Cl.[3] .......... F16C 1/10

[52] U.S. Cl. .......... 74/501 R; 74/502; 29/402.03; 29/426.5

[58] Field of Search .......... 74/108, 487, 501 R, 74/501.5, 502, 503, 522.5, 525; 29/402.03, 426.5

[56] References Cited

U.S. PATENT DOCUMENTS

| | | | |
|---|---|---|---|
| 1,072,876 | 9/1913 | Savage | 74/501 |
| 1,982,895 | 12/1934 | Winning | 74/503 |
| 2,893,419 | 7/1959 | Coulter | 74/501 |
| 3,021,721 | 2/1962 | Hooven | 74/501.5 |
| 3,021,962 | 2/1962 | Minty et al. | 74/501.5 |
| 3,101,821 | 8/1963 | Henry | 74/501 |
| 4,034,622 | 7/1977 | Deck | 74/510 |

*Primary Examiner*—Kenneth J. Dorner

*Attorney, Agent, or Firm*—Joseph W. Keen

[57] ABSTRACT

A flexible cable (24*a*) connected at one end to a throttle lever (not shown) is displaceable in a telescoping manner relative to a protective sheath (22) and is pivotally connected at its second end to a connecting lever (28,28'). The connecting lever (28,28') and a portion of the flexible cable (24*a*) reside within a housing (12) which is attachable to a mounting member (14). The connecting lever (28,28') has splines which are circumferentially engageable with a splined governor shaft (16,16') which protrudes from the side of the member (14) and extends into the housing (12) through an opening (12*a*). A cover (32) is attachable to the housing (12) in closely spaced axial relationship with the connecting lever (28,28') so as to prevent its disengagement from the governor shaft (16,16'). The connecting lever (28,28') extends into the opening (12*a*) to insure access to the connecting lever (28,28') when it is disengaged from the shaft (16,16'). The flexible cable (24*a*) has two extreme displacement limits (E,F) which correspond to two extreme rotative limits (E,F) for the shaft (16,16'). Method and apparatus are provided for maintaining the calibration and correspondence between the cable's displacement limits (E,F) and the shaft's rotative limits (E,F) when the connecting lever (28,28') is disassembled and reassembled with the governor shaft (16,16').

9 Claims, 4 Drawing Figures

THROTTLE LINKAGE STRUCTURE AND METHOD FOR ITS ASSEMBLY AND DISASSEMBLY

This is a continuation of Ser. No. 261,095, filed Oct. 9, 1980, now abandoned.

TECHNICAL FIELD

This invention relates generally to engine speed control and, more particularly, to a throttle linkage which may be readily removed from and reassembled with a governor shaft.

BACKGROUND ART

Throttle linkages typically extend between an operator work station and an engine governor apparatus. A signal indicative of the desired speed is impressed by an operator on the throttle linkage from the operator work station. The governor responds to the signal by changing the speed of a utilizing engine accordingly through an integral speed control mechanism. It has, heretofore, been common practice to provide a series of rigid links which are interconnected and pivoted relative to each other in transmitting the operator supplied signal to the governor. Recently, it was determined that, for certain applications, a control cable apparatus constituted a more desirable way to transmit the operator signal to the governor. Control cable apparatus includes a flexible cable which is axially displaceable relative to a protective sheath which houses and guides the flexible cable. When such cable is axially elongated relative to the sheath, the cable becomes exposed to the environment surrounding the sheath. In the case of control cable apparatus used on earthmoving equipment or in other adverse environments, debris and other foreign particles can adhere to and travel with the flexible cable when it is retracted into the sheath. Over long periods of use, the adhering foreign particles can abrade or otherwise adversely affect the performance of the control cable apparatus. When a housing was provided about the flexible cable at a point where the cable protruded from the sheath, it reduced the cable's exposure to the foreign particles, but also reduced accessibility to the flexible cable and made adjustment thereof more difficult.

A removable cover on the aforementioned throttle linkage housing was provided to gain access to a removable locking apparatus such as a snap ring or set screw which prevented relative axial displacement of and avoided disengagement between axial splines formed on the throttle linkage and a rotatable governor shaft. Such engagement permitted transmission of the operator signal from the throttle linkage through the governor shaft to the governor's speed control mechanism. Providing relative axial displacement therebetween was necessary when it was desired to disassemble the throttle linkage from the governor shaft for repair thereof. Such axial displacement was constrained by the aforementioned locking apparatus during operation of the throttle linkage and governor. Gaining access to the locking apparatus required extraction of fasteners or similar devices which secured the cover in place. Such fastener extraction required substantial time. Additionally, during reassembly of the throttle linkage and governor shaft, significant difficulty was often experienced in realigning the throttle linkage with the governor shaft.

The prior apparatus did not accomplish the dual goals of isolating the flexible cable from the surrounding environment and providing a throttle linkage amendable to quick disassembly from the governor shaft. The present invention is directed toward solving the prior apparatus' problems and reconciling the aforementioned goals.

DISCLOSURE OF THE INVENTION

In one aspect of the present invention a throttle linkage is provided which includes a connecting lever which is axially displaceable and circumferentially engageable with a splined governor shaft, a housing within which the connecting lever is housed, and a cover which is attachable to the housing in close axial proximity with the connecting lever to prevent its disengagement from the governor shaft. Removal of the throttle linkage from the governor shaft requires only the extraction of fasteners securing the housing to a mounting member.

In another aspect of the present invention a method for disassembling and reassembling a throttle linkage structure from and with a splined governor shaft includes detaching a housing from a mounting member, withdrawing the housing and a connecting lever which is contained within the housing and is engaged in a circumferentially desired relationship with the shaft in an axial direction relative to the shaft, recreating the desired circumferential relationship between the shaft and the connecting lever, and reattaching the housing to the mounting member. Removal of an access cover, which restrains relative axial movement between the connecting lever and governor shaft, from the housing is unnecessary unless inspection of the housing's interior is desired.

Causing the housing's access cover to ensure engagement between the connecting lever and shaft as well as provide access to the housing's interior enables the throttle linkage to be removed from the governor shaft by extraction of a relatively few fasteners which hold the housing to the mounting member. In addition to obviating the need for a locking device which retains engagement between the connecting lever and shaft, the assembly and disassembly methods are also greatly simplified since it is unnecessary to remove either the cover from the housing or the locking device from within the housing.

BEST MODE FOR CARRYING OUT THE INVENTION

Figure 1:
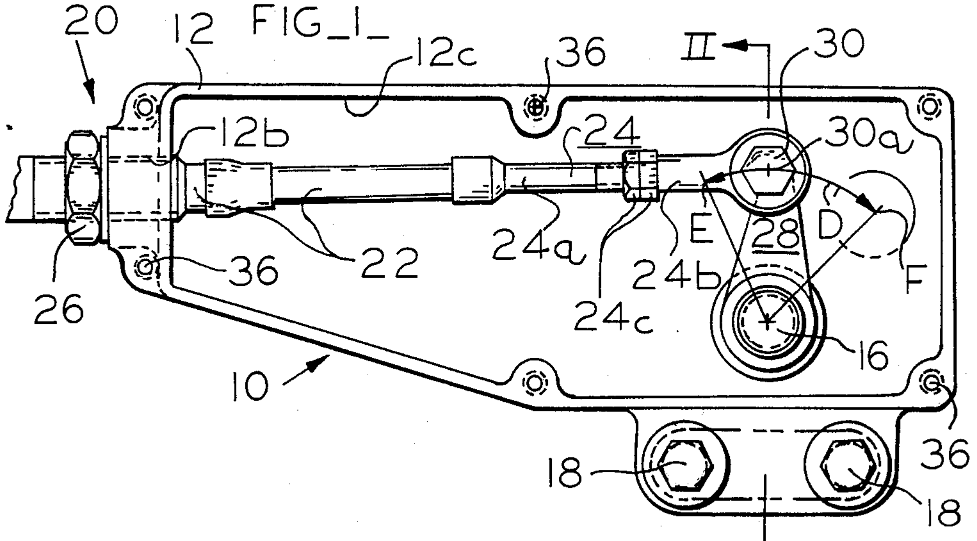
FIG. 1 is a front elevational view of the present invention in which an access cover has been removed.
Figure 2:
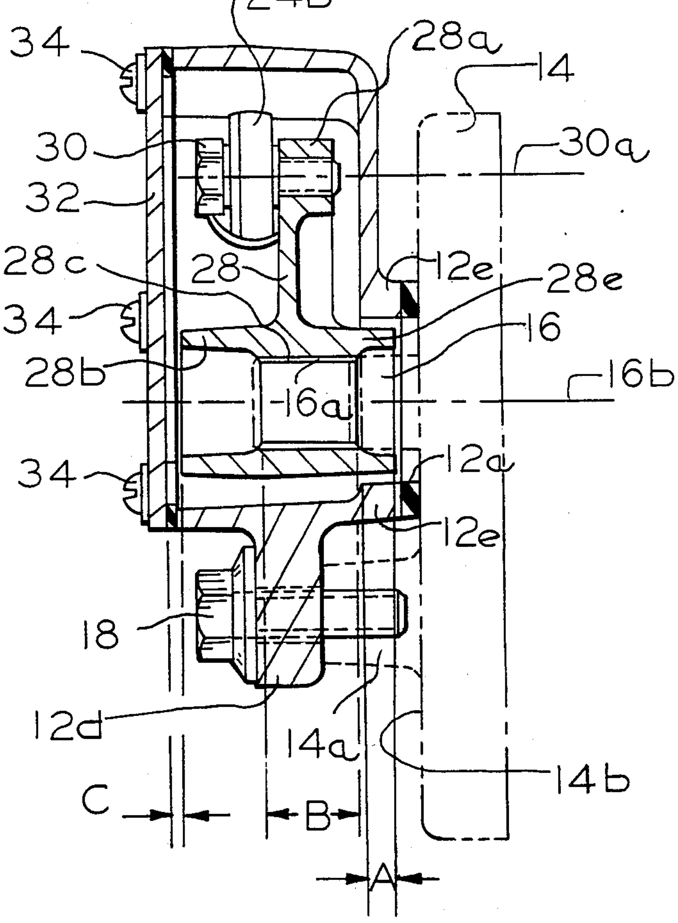
FIG. 2 is a transverse vertical section of the apparatus illustrated in FIG. 1 but with the cover arranged in assembled relationship.

A throttle linkage structure 10 is illustrated in FIGS. 1 and 2 and may be seen to include a housing 12 having a governor shaft opening 12*a*, a threaded linkage opening 12*b*, an access opening 12*c*, a transverse flange 12*d*, and mounting neck 12*e*. Housing 12 is securable to a mounting member 14 from which a splined governor shaft 16 protrudes. The mounting member 14 has a mounting boss 14*a* and a mounting planar structure 14*b*. Means for attaching the housing 12 to the mounting member 14 is provided and preferably constitutes screw bolts 18 which extend through the housing's transverse flange 12*d* and into threaded engagement with the mounting member's boss 14*a*.

Figure 3:
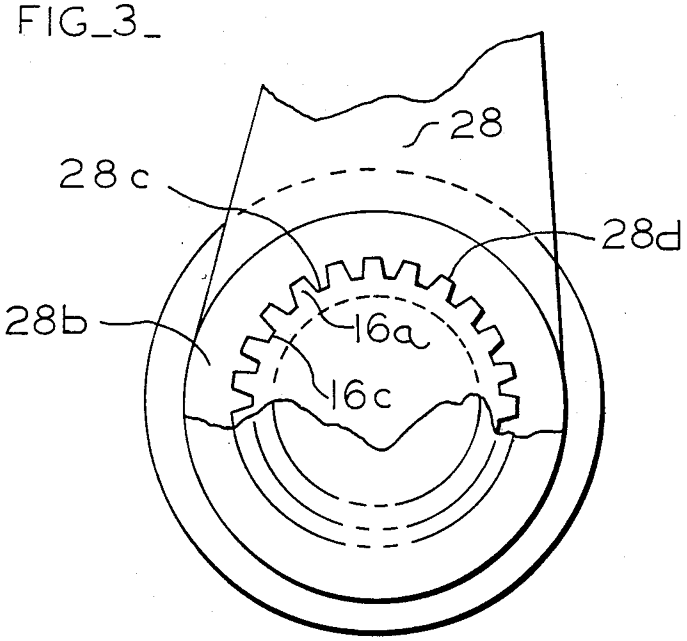
FIG. 3 is an enlarged front elevational view of an engaged connecting member and shaft which are shown in FIG. 1.

A throttle control apparatus 20 extends through linkage opening 12*b* and comprises a protective sheath assembly 22 which is in threaded engagement with the housing 12, a push-pull cable structure 24, and a connecting lever 28. The push-pull cable structure 24 includes a flexible cable 24*a*, a connecting member 24*b*, and means such as a pair of locking nuts 24*c* for connecting cable 24*a* and connecting member 24*b*. Flexible cable 24*a* is housed within and axially displaceable relative to the protective sheath 22. The length of the protective sheath 22 which protrudes into housing 12 is adjustable by suitably advancing or retracting it relative to the housing 12 at its threaded engagement through opening 12*b*. A locking nut 26 secures sheath 22 in the desired relation with housing 12 and provides corresponding displacement limits for connecting member 24*b*. The throttle control apparatus 20 extends to a work station (not shown) from which an operator can move the flexible cable 24*a* and thus actuate the throttle linkage 10. The connecting lever 28 is also disposed within housing 12 and is pivotally linked at its first or driving end 28*a* to the connecting member 24*b* by a screw bolt 30 or other pivotal connecting means. A second or driven end 28*b* of connecting lever 28 has an opening bounded by internal, axially extending teeth or splines 28*c* which are circumferentially engageable in the usual manner with a plurality of external teeth or splines 16*a* formed on the shaft 16. The preferred interconnection of connecting lever 28 and shaft 16 (best shown in FIG. 3) includes keyways 28*d* and 16*c* are respectively arranged for mating with the splines 16*a* and 28*c*. It is to be noted that the splines and keyways of FIG. 3 are of uniform size. While connecting lever 28 and splined governor shaft 16 are engaged to rotate together about a center line 16*b* of splined governor shaft 16, connecting lever 28 is axially displaceable relative to shaft 16 to facilitate engagement and disengagement therewith. As better seen in FIG. 2, driven end 28*b* includes an axially extending guide neck 28*e* which extends axially into governor shaft opening 12*a* in closely spaced concentric relationship therewith for a distance generally designated as A so as to ensure that connecting lever 28 is piloted within opening 12*a* when shaft 16 and connecting lever 28 are disengaged. Such piloting facilitates registry between connecting lever 28 and shaft 16 upon assembly of the throttle linkage 10 with the mounting member 14. The necessary relationship between extension distance A and other salient invention parameters for providing such piloting will be described hereinafter.

An access cover 32 is secured to housing 12 in obstructing relationship to access opening 12*c* by screws 34 or other means for attaching. Threaded openings 36 which receive screws 34 are formed in housing 12 as better illustrated in FIG. 1 where cover 32 has been removed for the sake of clarity.

The splines 28*c* and 16*a* are circumferentially engageable over an axial distance designated generally as B in FIG. 2 while cover 32 is axially separated from driven end 28*b* of connecting member 28 by a clearance distance generally designated as C in FIG. 2. Clearance distance C is, by necessity, less than engagement distance B so as to preclude disengagement between splines 16*a* and 28*c* when cover 32 is attached to housing 12 and no locking device is used. The extension distance A of guide neck 28*e* is greater than clearance distance C so as to insure piloting thereof in shaft opening 12*a*. The aforementioned relative dimensions can be attained by providing suitable axial lengths to the housing 12 and driven end 28*b* of connecting member 28.

A center line 30*a* of driving bolt 30 is constrained to follow an arcuate path generally designated as D between displacement limits of E and F. Since connecting member 24*b* and connecting lever 28 are joined by the driving bolt 30, displacement limits E and F respectively represent arcuate extremes and axial extremes for connecting member 28 and elongated structure 24. Such displacement limits, E and F, respectively correspond to the full power position and the off position along modulating path D of governor shaft 16.

The housing's transverse flange 12*d* and mounting neck 12*e* are simultaneously axially abuttable with the mounting member boss 14*a* and the mounting planar structure 14*b*, respectively. Selection of appropriate axial thicknesses for the aforementioned, abuttable components and connecting member 28 provides the desired relative extension, engagement, and clearance distances A, B, and C.

Figure 4:
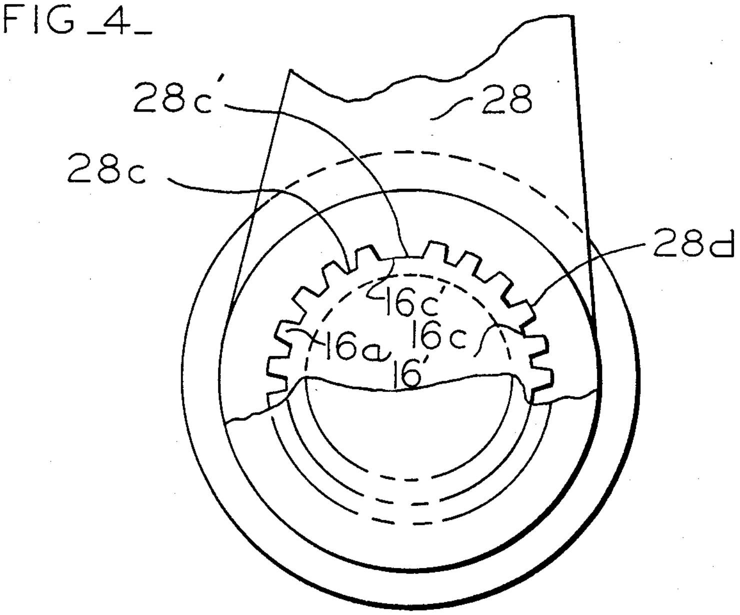
FIG. 4 is a front elevational view of an alternate embodiment of the mechanism illustrated in FIG. 3.

A connecting lever 28′ and a shaft 16′, illustrated in FIG. 4, constitute alternate structures to those of FIG. 3 and respectively include a single, circumferentially enlarged positioning spline 28*c*′ and a single, circumferentially enlarged positioning keyway 16*c*′ in addition to the normal splines 28*c*, 16*a* and mating keyways 28*d*, 16*c*. Due to its larger circumferential dimension, positioning spline 28*c*′ is only engageable with positioning keyway 16*c*′ so as to enable assembly of connecting member 28′ and shaft 16′ in a single relative circumferential configuration. While the positioning spline 28*c*′ is exemplified on connecting member 28′, it is to be understood that the enlarged, positioning spline could be disposed on shaft 16′ and the mating, positioning keyway could be disposed on connecting member 28′. Moreover, a single spline and keyway could be used exclusively on the engaging members to simultaneously provide circumferential engagement and relative positioning.

Also, the connecting member 28′ and shaft 16′ could be respectively substituted for connecting member 28 and shaft 16 and still obtain all the advantages of the present invention. It is to be further understood that correlating marks on an engageable spline and keyway are, likewise, considered to provide reproducibility of a single circumferential relationship between the shaft 16 and connecting member 28.

INDUSTRIAL APPLICABILITY

When the throttle linkage 10 is initially mounted on mounting member 14, protective sheath 22 is threadably advanced in threaded opening 12*b* to provide displacement limits of flexible cable 24*a* that result in extreme throttle lever positions (not shown) which are convenient for the operator and permit governor shaft 16 to occupy any operational position along the governor modulating path D. Locking nut 26 is then tightened to ensure retention of the desired, relative position between protective sheath 22 and housing 12. Proper positioning of sheath 22 relative to housing 12 can be tedious and difficult to accomplish within the constraints heretofore mentioned. As such, subsequent disassembly of the present invention throttle linkage 10 from mounting member 14 should, and does, obviate repositioning the locking nut 26 and sheath 22 relative to the housing 12.

During normal operation, the operator either withdraws or extends flexible cable 24*a* and connecting member 24*b* to change the engine speed. Connecting lever 28 is pivoted about longitudinal axis 30*a* of pivoting bolt 30. Since the driven end 28*b* of connecting lever 28 is firmly engaged with governor shaft 16, governor shaft 16 is rotated about its axial center line 16*b* which causes the governor's speed control mechanism to modulate the speed of the utilizing engine.

Disassembly of throttle linkage 10 from mounting member 14 and governor shaft 16 is accomplished while cover 32 is securely affixed to housing 12. By removing mounting bolts 18 and withdrawing housing 12 away from the mounting member 14 in an axial direction relative to governor shaft 16, the entire throttle linkage 10 is disassemblable from the governor 16 and mounting member 14.

To avoid recalibrating the travel extremes of flexible cable 24*a* by readjustment of sheath 22 relative to housing 12 and locking nut 26, the circumferential relationship between the driven end 28*b* of connecting lever 28 and governor shaft 16 must be recreated to what it was prior to disassembly. One method for recreating the circumferential relationship includes displacing flexible cable 24*a* and shaft 16 to one of their two displacement limits, E or F, prior to withdrawing the housing 12 and the components housed therein away from mounting member 14. At the time of reassembly it is only necessary to move flexible cable 24*a* and shaft 16 to the disassembly displacement limit prior to advancing the throttle linkage 10 in an axial direction relative to shaft 12 and reassembling connecting lever 28 with governor shaft 16. An alternate way of recreating the circumferential relationship includes manipulating shaft 16' and/or connecting lever 28' until keyway 16*c*' is circumferentially aligned with spline 28*c*'. While such alternate circumferential recreating method may be suitably used, the first method is preferred due to its simplicity.

When the desired circumferential relationship between governor shaft 16,16' and the driven end 28*b* of connecting lever 28,28' is achieved, throttle linkage 10 may be axially displaced relative to shaft 16,16' into circumferential engagement therewith. The extension distance A of guide neck 28*e* is greater than the axial clearance distance C so as to maintain guide neck 28*e* in piloted relationship with shaft opening 12*e* and facilitate its manipulation during reestablishment of the desired circumferential relationship between connecting lever 28,28' with shaft 16,16'. Maintenance of the piloted relationship provides ready access to the connecting lever 28,28' through the governor shaft opening 12*e*. The axial overlap, B, of the splines 16*a* and 28*c* must be greater than the axial clearance C between cover 32 and connecting lever 28 so as to preclude disengagement between shaft 16,16' and connecting levers 28,28'. Such engagement and clearance dimensions B and C, respectively, are insured by providing suitable cooperative axial thicknesses to connecting lever 28, housing flange 12*d*, axially mateable mounting boss 14*a*, mounting neck 12*e*, and mounting planar structure 14*b*. When abutment between mounting member 14 and housing 12 is attained, connection bolts 18 are reinserted and suitably torqued to secure throttle linkage 10 to mounting member 14 and governor shaft 16. Access cover 32 need be removed only in case inspection of the components housed within housing 12 is desired or repair of them is necessitated.

It will now be apparent that an improved throttle linkage 10 and method for assemblying the throttle linkage 10 with a splined shaft 16,16' has been provided in which assembly and disassembly thereof is facilitated by using a connecting lever 28,28' which is axially separable from the inspection cover 32 by a distance C which is smaller than the guide neck's axial extension distance A in the governor shaft opening 12*a* and the axial spline engagement distance B. Such relative dimensions on the throttle linkage 10 prevent disengagement of the governor shaft 16,16' from the connecting lever 28,28' when housing 12 is attached to mounting member 14 and ensures ready access to connecting lever 28,28' through shaft opening 12*a* when access cover 32 is attached to housing 12. Normal disassembly and reassembly of throttle linkage 10 and governor shaft 16,16' may be completed without removal of cover 32 or any shaft interlocking device by simply removing bolts 18 and reinserting the same, respectively.

I claim:

1. A throttle linkage structure (10) which is readily removable from and reassemblable with a rotatable governor shaft (16,16') protruding from a mounting member (14), said throttle linkage structure (10) comprising:
   - a housing (12) which is attachable to the mounting member (14), said housing (12) having a governor shaft opening (12*a*) through which the shaft (16,16') is extendable, a linkage opening (12*b*), and an access opening (12*c*) for inspecting the interior of said housing (12);
   - a throttle control structure (20) extendable through said linkage opening (12*b*), said throttle control structure (20) being axially displaceable relative to said housing (12) between two displacement limits (E,F), said throttle control structure (20) including a connecting lever (28,28') disposed in said housing (12) and having an end (28*b*) including a guide neck (28*e*) which extends into the governor shaft opening (12*a*), said end (28*b*) being engageable with the governor shaft (16,16') for a predetermined axial distance (B) so as to rotate therewith;
   - a cover (32) attachable to said housing (12) across said access opening (12*c*), said cover (32) being axially separated from said connecting lever (28,28') by a separation distance (C) which is less than said predetermined engagement distance (B) to restrict axial displacement of said connecting lever (28,28') and the governor shaft (16,16').

2. The throttle linkage structure (10) of claim 1 wherein said guide neck (28*e*) extends a predetermined axial distance (A) into said shaft opening (12*a*), said predetermined axial distance (A) being greater than said separation distance (C).

3. The throttle linkage structure (10) of claim 1 further comprising:
   - means (22,12*b*) for adjusting the displacement limits (E and F) of said throttle control structure (20).

4. The throttle linkage structure (10) of claim 1 further comprising:
   - means for providing a single engagement configuration between said connecting lever's end (28*b*) and the shaft member (16,16') to assure retention of the throttle control structure's displacement limits (E,F) from a time prior to removal of the throttle linkage structure (10) from the mounting member (14) to reassembly thereof.

5. The throttle linkage structure (10) of claim 4, said single engagement configuring means comprising:

an axially extending, circumferentially positioning keyway (16c') disposed on one of said members (16'), said keyway (16c') having a circumferential dimension of predetermined arcuate length; and an axially extending, circumferentially positioning spline (28c') disposed on the other of said members (28'), said positioning spline (28c') having a circumferential dimension corresponding to that of said positioning keyway (16c') such that said positioning spline (28c') is disposable only in said positioning keyway (16c').

6. A method for disassembling and reassembling a throttle linkage structure (10) from a rotatable splined governor shaft (16,16') protruding from mounting member (14), said method comprising:

detaching a throttle linkage housing (12) having an attached access cover (32) from the mounting member (14);

withdrawing the housing (12) and a connecting lever (28,28') which is disposed within the housing (12) and engaged in a circumferentially desired relationship with the shaft (16,16') in an axial direction relative to the shaft (16,16') until said connecting lever (28,28') disengages from said shaft (16,16');

recreating the circumferentially desired relationship between the shaft (16,16') and the connecting lever (28,28');

displacing said housing (12) and connecting lever (28,28') in an axial direction relative to the shaft (16,16') until said connecting lever (28,28') engages a predetermined axial length (B) of the shaft's splines (16a); and attaching said housing (12) to the mounting member (14).

7. The method of claim 6 further comprising:

displacing said connecting lever (28,28') to one of its two displacement limits (E,F) prior to the withdrawing step.

8. The method of claim 7 wherein recreating said circumferentially reproducable relationship comprises:

displacing the connecting lever (28,28') to the displacement limit (E,F) attained in claim 7.

9. The method of claim 6 wherein recreating said circumferentially desired relationship comprises:

circumferentially aligning a predetermined spline (28c') disposed on one of the members (28') with a predetermined keyway (16c') disposed on the other of the members (16').

* * * * *